(12) United States Patent
Nakada et al.

(10) Patent No.: US 11,827,212 B2
(45) Date of Patent: Nov. 28, 2023

(54) PARKING ASSIST SYSTEM

(71) Applicant: HONDA MOTOR CO., LTD., Tokyo (JP)

(72) Inventors: Yuki Nakada, Saitama (JP); Hiroshi Yamanaka, Saitama (JP); Yuki Hara, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 556 days.

(21) Appl. No.: 17/095,996

(22) Filed: Nov. 12, 2020

(65) Prior Publication Data
US 2021/0179076 A1    Jun. 17, 2021

(30) Foreign Application Priority Data

Dec. 13, 2019  (JP) ................................. 2019-225936

(51) Int. Cl.
| | |
|---|---|
| *B60W 30/06* | (2006.01) |
| *B60W 30/14* | (2006.01) |
| *B60W 10/18* | (2012.01) |
| *B60T 7/22* | (2006.01) |
| *G06V 20/58* | (2022.01) |
| *G06V 20/56* | (2022.01) |

(52) U.S. Cl.
CPC ............... *B60W 30/06* (2013.01); *B60T 7/22* (2013.01); *B60W 10/18* (2013.01); *B60W 30/146* (2013.01); *G06V 20/58* (2022.01); *G06V 20/588* (2022.01); *B60T 2201/10* (2013.01); *B60W 2520/30* (2013.01)

(58) Field of Classification Search
None
See application file for complete search history.

(56) References Cited

U.S. PATENT DOCUMENTS

| | | | |
|---|---|---|---|
| 9,718,404 B2 | 8/2017 | Nallapa et al. | |
| 10,814,863 B2 | 10/2020 | Kim | |
| 11,623,636 B2* | 4/2023 | Tsujino | ................. B60W 30/06 701/25 |
| 2006/0271278 A1 | 11/2006 | Sakakibara et al. | |

(Continued)

FOREIGN PATENT DOCUMENTS

| | | |
|---|---|---|
| CN | 106560347 A | 4/2017 |
| CN | 107985305 A | 5/2018 |
| JP | 2015105070 A | 6/2015 |

(Continued)

OTHER PUBLICATIONS

Notice of Reasons for Refusal for Patent Application JP 2019-225936 dated Jul. 27, 2021; 8 pp.

(Continued)

*Primary Examiner* — K. Wong
(74) *Attorney, Agent, or Firm* — Armstrong Teasdale LLP (57) ABSTRACT

A parking assist system is configured to autonomously move a vehicle to a target parking position. The parking assist system includes: a distance acquiring unit configured to acquire a distance between the vehicle and a vehicle stopper provided in the target parking position; and a control unit configured to control a movement of the vehicle to the target parking position based on the distance acquired by the distance acquiring unit.

10 Claims, 6 Drawing Sheets

(56) References Cited

U.S. PATENT DOCUMENTS

2019/0375381 A1    12/2019  Nakagawa et al.
2020/0398822 A1*   12/2020  Hara .................... B60W 30/09

FOREIGN PATENT DOCUMENTS

| | | |
|---|---|---|
| JP | 2018075899 A | 5/2018 |
| JP | 2018122789 A | 8/2018 |
| JP | 2019093761 A | 6/2019 |
| JP | 2019093762 A | 6/2019 |
| JP | 2019107937 A | 7/2019 |
| JP | 2019127189 A | 8/2019 |
| JP | 2019139696 A | 8/2019 |

OTHER PUBLICATIONS

Office Action for Chinese Patent Application No. 202011437254.1 dated Aug. 22, 2023; 12 pp.

* cited by examiner

PARKING ASSIST SYSTEM

TECHNICAL FIELD

The present invention relates to a parking assist system configured to autonomously move a vehicle to a target parking position.

BACKGROUND ART

Conventionally, various methods have been proposed for stopping a vehicle at a prescribed position. For example, JP2019-93761A discloses a traveling assist device for a vehicle. This traveling assist device includes a step determination unit and a brake force/driving force setting unit. The step determination unit executes a determination process to determine whether a step with which a wheel comes into contact is a step for stopping the vehicle. When the step determination unit determines that the step with which the wheel comes into contact is the step for stopping the vehicle, the brake force/driving force setting unit executes stop request control to request that the vehicle be stopped by increasing a brake force of the vehicle.

In JP2019-93761A, the brake force of the vehicle is increased after the wheel comes into contact with the step for stopping the vehicle (hereinafter referred to as "vehicle stopper"). Thus, the driving force and the brake force of the vehicle cannot be adjusted according to a distance between the vehicle and the vehicle stopper before the wheel comes into contact with the vehicle stopper. Accordingly, the wheel may come into contact with the vehicle stopper in a state where the driving force of the vehicle is relatively large, which may increase the impact caused by the contact between the wheel and the vehicle stopper and affect the riding comfort of the vehicle.

SUMMARY OF THE INVENTION

In view of such a problem of the prior art, a primary object of the present invention is to provide a parking assist system that can mitigate the impact caused by the contact between a wheel and a vehicle stopper and improve the riding comfort of a vehicle.

To achieve such an object, one embodiment of the present invention provides a parking assist system (1) configured to autonomously move a vehicle (V) to a target parking position (P3), including: a distance acquiring unit (7, 41) configured to acquire a distance between the vehicle and a vehicle stopper (Z) provided in the target parking position; and a control unit (43) configured to control a movement of the vehicle to the target parking position based on the distance acquired by the distance acquiring unit.

According to this arrangement, parking control of the vehicle can be started according to the distance between the vehicle and the vehicle stopper before the wheel comes into contact with the vehicle stopper. Accordingly, it is possible to prevent the wheel from coming into contact with the vehicle stopper in a state where a driving force of the vehicle is relatively large. Thus, the impact caused by the contact between the wheel and the vehicle stopper can be mitigated and the riding comfort of the vehicle can be improved.

In the above arrangement, preferably, when the vehicle moves to the target parking position, the control unit limits a vehicle speed of the vehicle and/or an N times differential value (N is an integer) of the vehicle speed within a prescribed range.

According to this arrangement, it is possible to prevent the wheel from coming into contact with the vehicle stopper in a state where the vehicle speed of the vehicle and/or the N times differential value of the vehicle speed is excessive. Thus, the impact caused by the contact between the wheel and the vehicle stopper can be mitigated more effectively and the riding comfort of the vehicle can be further improved.

In the above arrangement, preferably, the vehicle includes at least one wheel (W), and when the vehicle moves to the target parking position, the control unit controls a driving force and/or a brake force of the vehicle such that driving torque of the wheel is smaller than climbing-over torque that enables the wheel to climb over the vehicle stopper.

According to this arrangement, it is possible to prevent the wheel from climbing over the vehicle stopper when the vehicle reaches the target parking position.

In the above arrangement, preferably, while the vehicle is moving to the target parking position, the control unit determines whether the wheel has come into contact with a step (S) located on an upstream side of the vehicle stopper in a moving direction of the vehicle to the target parking position, and in a case where the control unit determines that the wheel has come into contact with the step, the control unit sets the driving force of the vehicle based on a contact state of the step and the wheel such that the driving torque of the wheel is smaller than the climbing-over torque.

According to this arrangement, it is possible to set the driving force of the vehicle to an appropriate value based on the contact state of the step and the wheel while preventing the wheel from climbing over the vehicle stopper.

In the above arrangement, preferably, the at least one wheel comprises a plurality of wheels, and the control unit is configured to set the driving force of the vehicle based on the number of wheels that have come into contact with the step.

According to this arrangement, it is possible to set the driving force of the vehicle to an appropriate value based on the number of wheels that have come into contact with the step.

In the above arrangement, preferably, the control unit is configured to set the driving force of the vehicle according to whether the wheel that has come into contact with the step is a driving wheel or a driven wheel.

According to this arrangement, it is possible to set the driving force of the vehicle to an appropriate value according to whether the wheel that has come into contact with the step is the driving wheel or the driven wheel.

In the above arrangement, preferably, in a case where the control unit corrects a parking position of the vehicle after the vehicle has moved to the target parking position, the control unit sets a first maximum vehicle speed lower than a second maximum vehicle speed, the first maximum vehicle speed being a maximum vehicle speed of the vehicle at correction of the parking position of the vehicle, the second maximum vehicle speed being the maximum vehicle speed of the vehicle at the movement of the vehicle to the target parking position.

According to this arrangement, an occupant can easily perform a brake operation (for example, a pressing on a brake pedal) of the vehicle when the vehicle moves from the target parking position for correcting the parking position of the vehicle.

In the above arrangement, preferably, when the vehicle moves the distance acquired by the distance acquiring unit, the control unit stops the vehicle.

According to this arrangement, it is possible to stop the vehicle at an appropriate position according to the distance between the vehicle and the vehicle stopper. Thus, the impact caused by the contact between the wheel and the vehicle stopper can be mitigated more effectively and the riding comfort of the vehicle can be further improved.

In the above arrangement, preferably, in a case where the vehicle stopper is not present in the target parking position, the distance acquiring unit sets a virtual vehicle stopper in the target parking position and acquires a distance between the vehicle and the virtual vehicle stopper, and in the case where the vehicle stopper is not present in the target parking position, the control unit controls the movement of the vehicle to the target parking position based on the distance between the vehicle and the virtual vehicle stopper.

According to this arrangement, it is possible to stop the vehicle at an appropriate position even if the vehicle stopper is not present.

In the above arrangement, preferably, in a case where an object whose height is equal to or lower than a prescribed reference height is detected in a specific area (R) of the target parking position in execution of perpendicular parking, the distance acquiring unit recognizes the object as the vehicle stopper, and in a case where the object whose height is equal to or lower than the reference height is detected in an area other than the specific area in the execution of the perpendicular parking, the distance acquiring unit does not recognize the object as the vehicle stopper or an obstacle.

According to this arrangement, it is possible to continue parking assistance even if the step or the like whose height is equal to or lower than the reference height is present in the area other than the specific area. Accordingly, the parking assist system can be more convenient.

Thus, according to the above arrangements, it is possible to provide a parking assist system that can mitigate the impact caused by the contact between a wheel and a vehicle stopper and improve the riding comfort of a vehicle.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
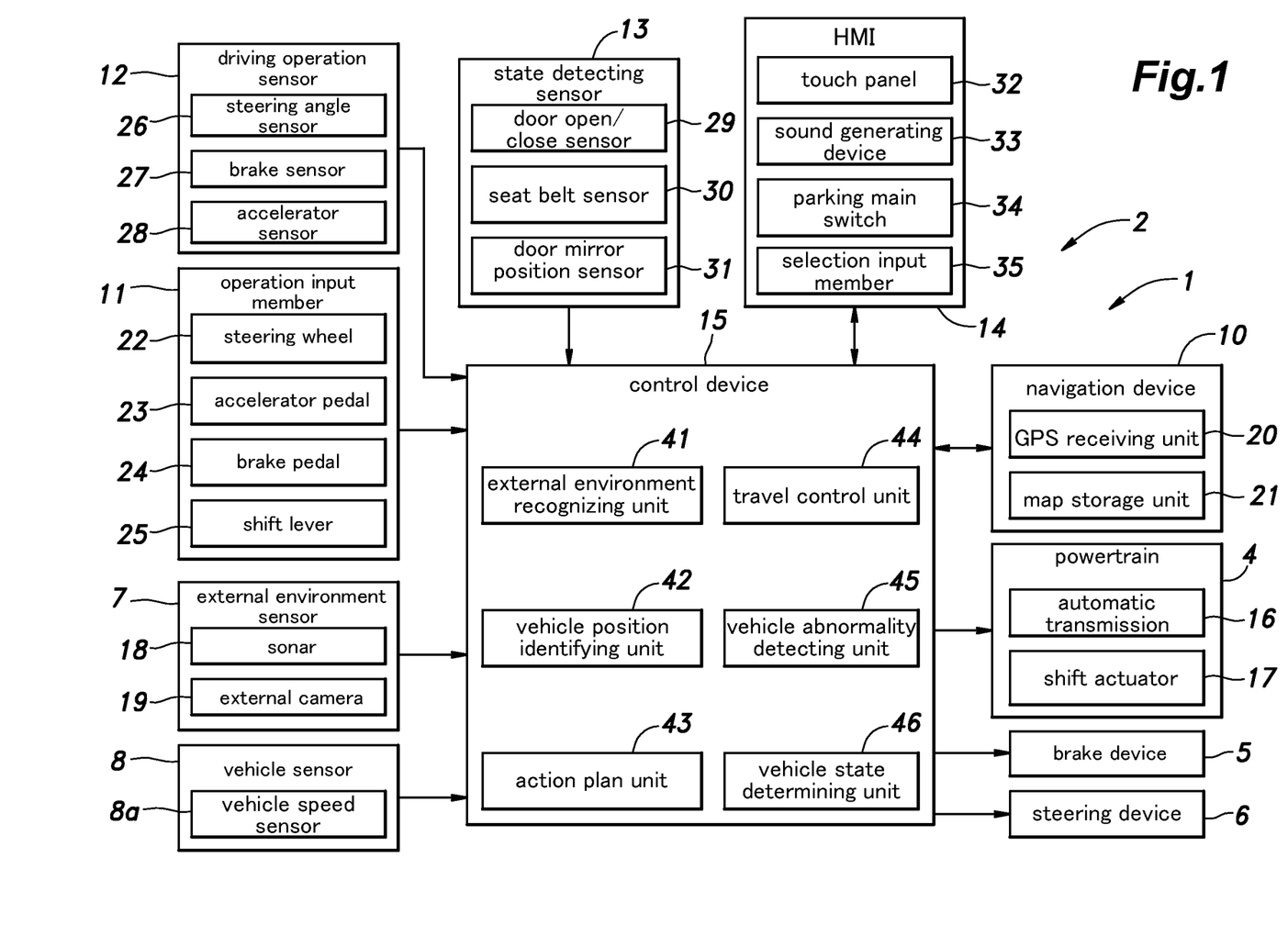
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply a brake pressure (an oil pressure) to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object, thereby detecting the position (distance and direction) of the object. Plural sonars 18 are provided at each of a rear portion and a front portion of the vehicle. In the present embodiment, a pair of sonars 18 are provided on a rear bumper so as to be spaced laterally from each other, a pair of sonars 18 are provided on a front bumper so as to be spaced laterally from each other, and four sonars 18 are provided at front and rear ends of both lateral surfaces of the vehicle, respectively. Namely, the vehicle is provided with eight sonars 18 in total. The sonars 18 provided on the rear bumper mainly detect the positions of the objects behind the vehicle. The sonars 18 provided on the front bumper mainly detect the positions of the objects in front of the vehicle. The sonars 18 provided at the front ends of both lateral surfaces of the vehicle detect the positions of the objects on left and right outsides of the front end of the vehicle, respectively. The sonars 18 provided at the rear ends of both lateral surfaces of the vehicle detect the positions of the objects on left and right outsides of the rear end of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor 8a configured to detect the vehicle speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the vehicle speed sensor 8a consists of plural wheel speed sensors. Each wheel speed sensor is configured to detect the wheel speed (the rotational speed of each wheel). For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a turning angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15 and the external environment sensor 7.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a vehicle stopper (wheel stopper) or an obstacle is present, and obtains the size of the vehicle stopper or the obstacle in a case where the vehicle stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
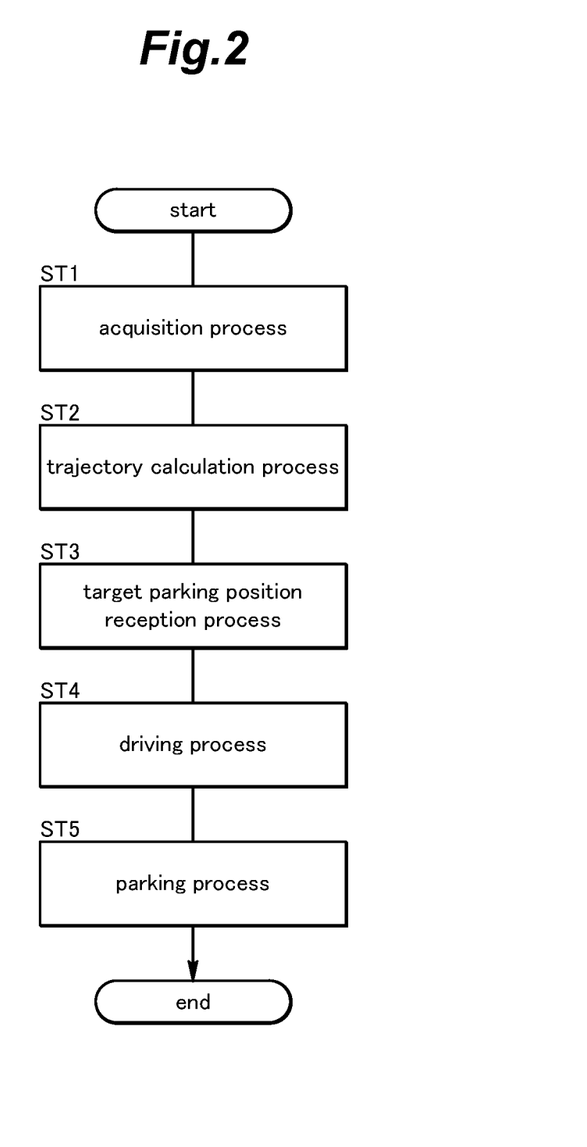
FIG. 2 is a flowchart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
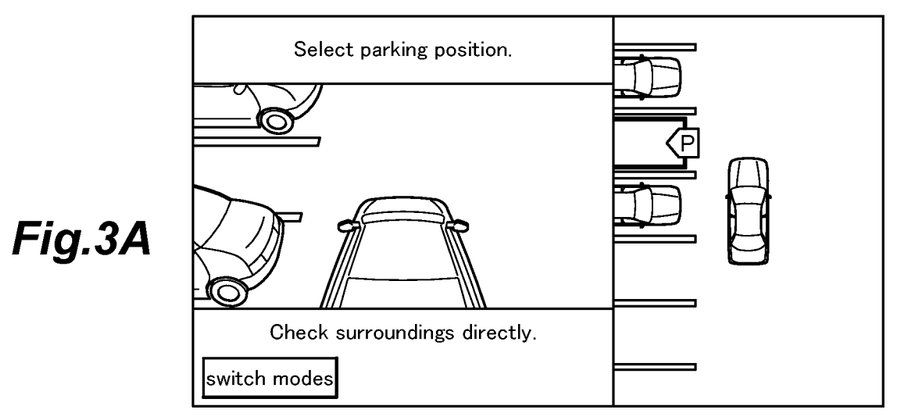
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
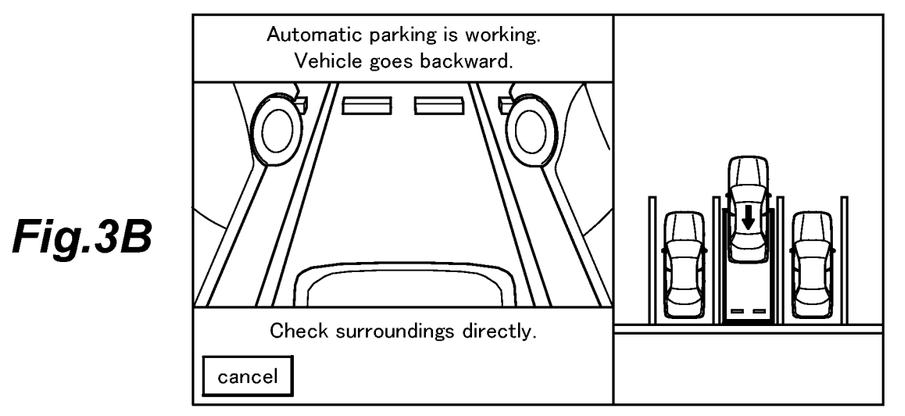
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
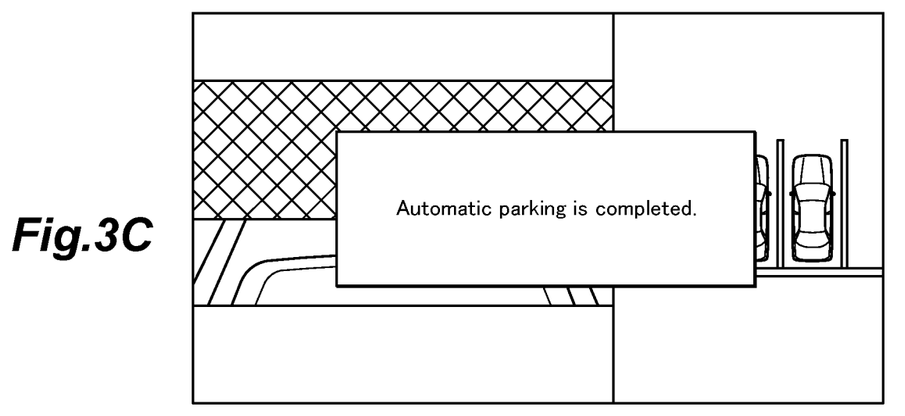
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof <The Driving Process>

Figure 4:
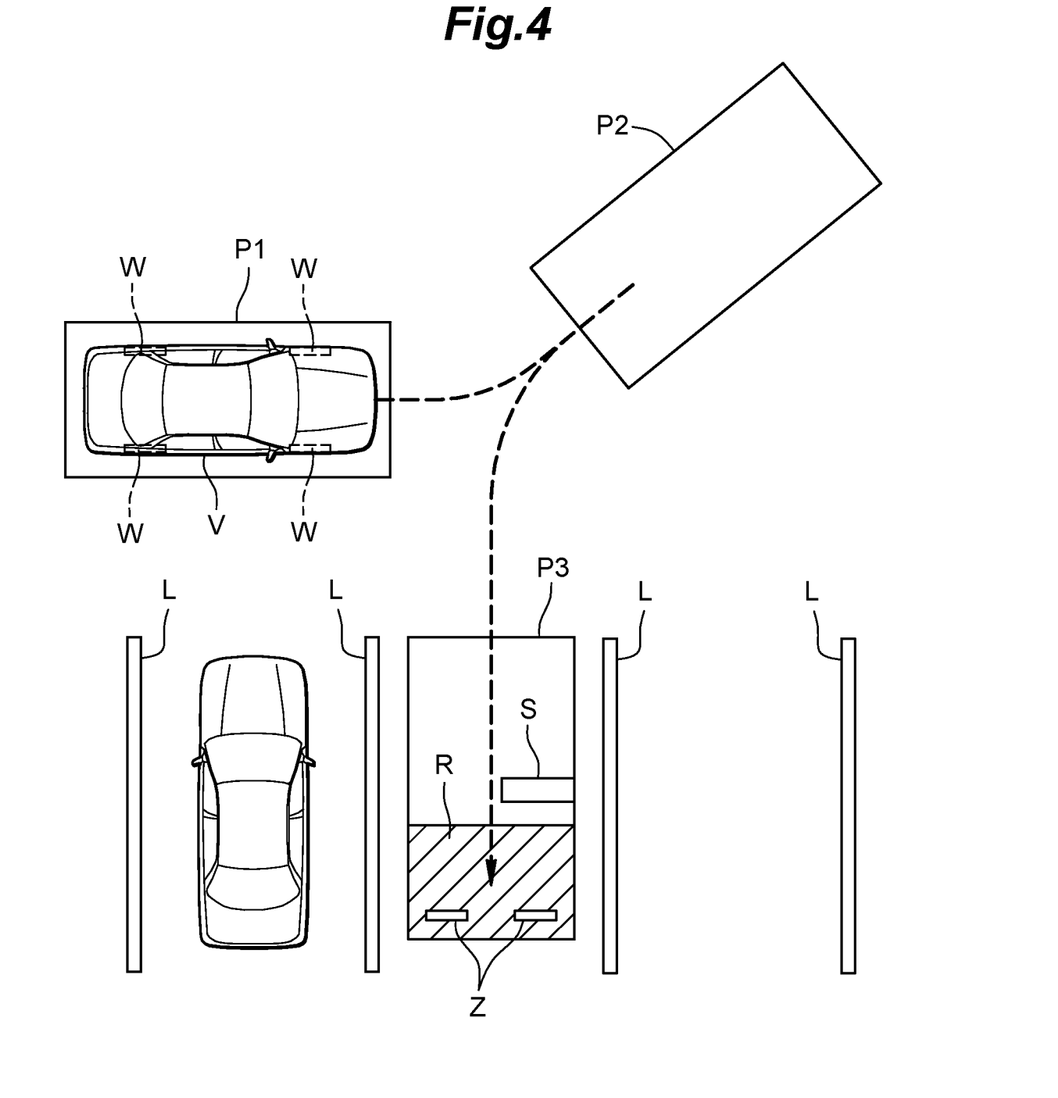
FIG. 4 is a plan view for explaining the driving process in the parking assist system according to the embodiment.
Figure 5:
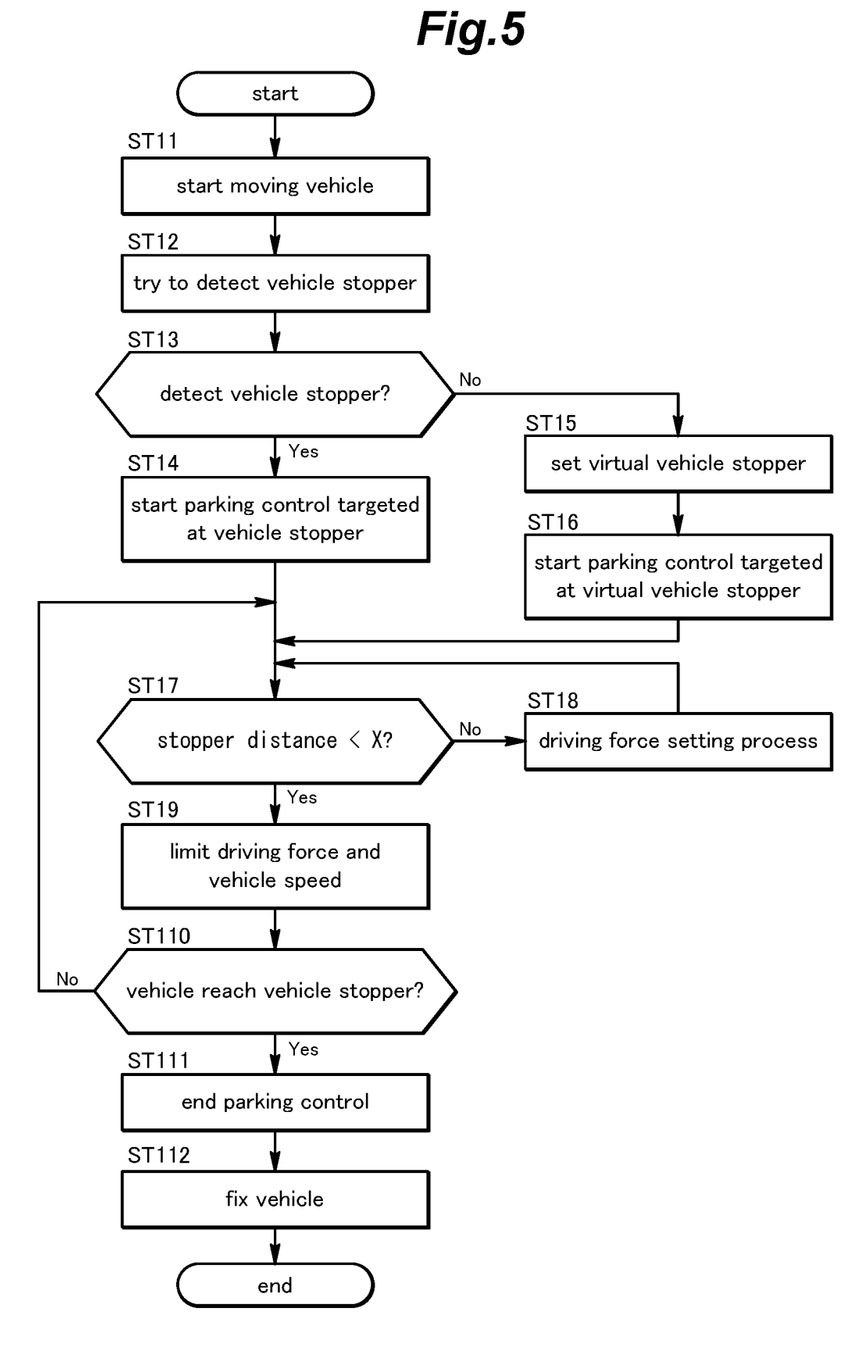
FIG. 5 is a flowchart of the driving process in the parking assist system according to the embodiment.

Next, with reference to FIGS. 4 and 5, the driving process (step ST4) of the above-mentioned automatic parking process will be described. In the following, the driving process for perpendicular parking in which the moving direction of a vehicle V is switched will be cited as an example. However, a similar driving process can be applicable to perpendicular parking in which the moving direction of the vehicle V is not switched, parallel parking, angle parking, and the like. In the following, the expressions "upstream side" or "downstream side" will indicate an upstream side (near side) or a downstream side (far side) in the moving direction (see a broken line arrow in FIG. 4) of the vehicle V from a movement starting position P1 to a target parking position P3 via a switching position P2.

When the driving process is started, the action plan unit 43 (an example of a control unit) starts moving the vehicle V from the movement starting position P1 to the target parking position P3 (step ST11). In the present embodiment, at the start of the driving process, the forward movement speed of the vehicle V is set to a speed equal to or less than V1, and the backward movement speed of the vehicle V is set to a speed equal to or less than V2, which is lower than V1. First, the action plan unit 43 moves the vehicle V forward from the movement starting position P1 at the speed equal to or less than V1. After that, the action plan unit 43 switches the moving direction of the vehicle V at the switching position P2, and then moves the vehicle V backward at the speed equal to or less than V2.

As the vehicle V continues moving backward, the vehicle V moves to a position where the external environment sensor 7 (an example of a distance acquiring unit) can detect an object present in a specific area R (an area hatched in FIG. 4), which is set in a downstream side part of the target parking position P3. Accordingly, the external environment sensor 7 tries to detect a vehicle stopper Z (which consists of a pair of wheel stoppers in FIG. 4) provided in the specific area R (step ST12). Such a trial to detect the vehicle stopper Z can be made by using any sensor included in the external environment sensor 7, such as the sonars 18, the external cameras 19, the millimeter wave radar, and the laser lidar.

Next, the external environment recognizing unit 41 (an example of a distance acquiring unit) determines whether the external environment sensor 7 detects the vehicle stopper Z in the specific area R in step ST12 (step ST13). For example, in a case where the external environment sensor 7 detects a low object (an object whose height is equal to or less than a prescribed reference height H) in the specific area R, the external environment recognizing unit 41 determines that the external environment sensor 7 detects the vehicle stopper Z in the specific area R. On the other hand, in a case where the external environment sensor 7 does not detect the low object in the specific area R, the external environment recognizing unit 41 determines that the external environment sensor 7 does not detect the vehicle stopper Z in the specific area R.

In a case where the external environment recognizing unit 41 determines that the external environment sensor 7 detects the vehicle stopper Z in the specific area R (in a case where the determination in step ST13 is Yes), the external environment recognizing unit 41 calculates a distance between the vehicle V and the vehicle stopper Z based on the position of the vehicle V detected by the vehicle position identifying unit 42 and the position of the vehicle stopper Z detected by the external environment sensor 7. Then, the action plan unit 43 starts a parking control of the vehicle V targeted at the vehicle stopper Z based on the distance between the vehicle V and the vehicle stopper Z calculated by the external environment recognizing unit 41 (step ST14).

On the other hand, in a case where the external environment recognizing unit 41 determines that the external environment sensor 7 does not detect the vehicle stopper Z in the specific area R (in a case where the determination in step ST13 is No), the external environment recognizing unit 41 sets a virtual vehicle stopper in the specific area R (step ST15). For example, in a case where the external environment sensor 7 detects at least one marking line L such as a white line on one side or both sides of the target parking position P3, the external environment recognizing unit 41 sets the virtual vehicle stopper at a position separated from an upstream side end of the marking line L by a prescribed distance.

Next, the external environment recognizing unit 41 calculates a distance between the vehicle V and the virtual vehicle stopper based on the position of the vehicle V detected by the vehicle position identifying unit 42 and the position of the virtual vehicle stopper. Then, the action plan unit 43 starts the parking control of the vehicle V targeted at the virtual vehicle stopper based on the distance between the vehicle V and the virtual vehicle stopper calculated by the external environment recognizing unit 41 (step ST16).

When the parking control of the vehicle V is started in step ST14 or step ST16, the action plan unit 43 determines whether the distance between the vehicle V and the vehicle stopper Z or the virtual vehicle stopper (hereinafter referred to as "stopper distance") becomes less than a prescribed distance X (step ST17).

In a case where the action plan unit 43 determines that the stopper distance is equal to or more than the prescribed distance X (in a case where the determination in step ST17 is No), the action plan unit 43 executes a driving force setting process, which will be described in detail later (step ST18). In another embodiment, the action plan unit 43 may execute the driving force setting process in a case where the action plan unit 43 determines that the stopper distance becomes less than the prescribed distance X (in a case where the determination in step ST17 is Yes). Alternatively, the action plan unit 43 may execute the driving force setting process regardless of the stopper distance. When step ST18 ends, the action plan unit 43 again determines whether the stopper distance becomes less than the prescribed distance X (step ST17).

On the other hand, in a case where the action plan unit 43 determines that the stopper distance becomes less than the prescribed distance X (in a case where the determination in step ST17 is Yes), the action plan unit 43 limits the driving force of the vehicle V to a value less than a prescribed upper limit U and limits the backward movement speed (an example of the vehicle speed) of the vehicle V to a speed equal to or less than V3, which is lower than V2 (step ST19). The above upper limit U is set in consideration of the relationship between driving torque of each wheel W and climbing-over torque that enables each wheel W to climb over the vehicle stopper Z. More specifically, the upper limit U is set such that the driving torque of each wheel W is smaller than the climbing-over torque if the driving force of the vehicle V is less than the upper limit U. The upper limit U may be set to a constant value regardless of the stopper distance, or may be set to gradually decrease as the stopper distance decreases.

Next, the action plan unit 43 determines whether the vehicle V has reached the vehicle stopper Z (or the virtual vehicle stopper) (step ST110). For example, in a case where the vehicle V has moved the stopper distance calculated by the external environment recognizing unit 41 in step ST14 or step ST16, the action plan unit 43 determines that the vehicle V has reached the vehicle stopper Z. In a case where the vehicle V has not moved the above stopper distance, the action plan unit 43 determines that the vehicle V has not reached the vehicle stopper Z.

In a case where the action plan unit 43 determines that the vehicle V has not reached the vehicle stopper Z (in a case where the determination in step ST110 is No), the action plan unit 43 again determines whether the stopper distance becomes less than the prescribed distance X (step ST17). Incidentally, when the external environment sensor 7 detects an obstacle (an object whose height is more than the reference height H) in the specific area R, the action plan unit 43 temporarily stops the vehicle V and suspends the driving process even if the action plan unit 43 determines that the vehicle V has not reached the vehicle stopper Z (even if the determination in step ST110 is No).

On the other hand, in a case where the action plan unit 43 determines that the vehicle V has reached the vehicle stopper Z (in a case where the determination in step ST110 is Yes), the action plan unit 43 stops the vehicle V regardless of whether each wheel W comes into contact with the vehicle stopper Z, and ends the parking control of the vehicle V (step ST111).

Next, the action plan unit 43 fixes the vehicle V at a position where the vehicle V has stopped in step ST111 (step ST112). For example, the action plan unit 43 fixes the vehicle V by locking each wheel W and/or a power transmission mechanism (a mechanism for transmitting power from the power source to each wheel W). The action plan unit 43 may lock each wheel W by using a mechanical brake or an electric parking brake. The action plan unit 43 may lock the power transmission mechanism by changing the shift position of the automatic transmission 16 from a reverse position (reverse range) to a parking position (parking range) so as to lock the gears of the automatic transmission 16. When step ST112 ends, the driving process ends.

As described above, the action plan unit 43 is configured to control the movement of the vehicle V to the target parking position P3 based on the stopper distance calculated by the external environment recognizing unit 41. Thus, the parking control of the vehicle V can be started according to the stopper distance before each wheel W comes into contact with the vehicle stopper Z. Accordingly, it is possible to prevent each wheel W from coming into contact with the vehicle stopper Z in a state where the driving force of the vehicle V is relatively large. Thus, the impact caused by the contact between each wheel W and the vehicle stopper Z can be mitigated and the riding comfort of the vehicle V can be improved.

Further, the action plan unit 43 limits the vehicle speed of the vehicle V within a prescribed range from the start to the end of the driving process. Thus, it is possible to prevent each wheel W from coming into contact with the vehicle stopper Z in a state where the vehicle speed of the vehicle V is excessive. Thus, the impact caused by the contact between each wheel W and the vehicle stopper Z can be mitigated more effectively and the riding comfort of the vehicle V can be further improved. In another embodiment, the action plan unit 43 may limit an N times differential value (N is an integer) of the vehicle speed such as the acceleration or the jerk within the prescribed range. In order to effectively mitigate the impact caused by the contact between each wheel W and the vehicle stopper Z, the action plan unit 43 may limit the vehicle speed of the vehicle V and/or the N times differential value of the vehicle speed within the prescribed range.

Further, the action plan unit 43 controls the driving force of the vehicle V such that the driving torque of each wheel W is smaller than the climbing-over torque. Thus, it is possible to prevent each wheel W from climbing over the vehicle stopper Z when the vehicle V reaches the target parking position P3. In another embodiment, the action plan unit 43 may control the brake force of the vehicle V such that the driving torque of each wheel W is smaller than the climbing-over torque, or may control both the driving force and the brake force of the vehicle V such that the driving torque of each wheel W is smaller than the climbing-over torque.

Further, when the vehicle V moves the stopper distance calculated by the external environment recognizing unit 41, the action plan unit 43 stops the vehicle V. Accordingly, it is possible to stop the vehicle V at an appropriate position according to the stopper distance. Thus, the impact caused by the contact between each wheel W and the vehicle stopper Z can be mitigated more effectively and the riding comfort of the vehicle V can be further improved.

Further, in a case where the vehicle stopper Z is not present in the target parking position P3, the action plan unit 43 controls the movement of the vehicle V to the target parking position P3 based on the distance between the vehicle V and the virtual vehicle stopper. Thus, it is possible to stop the vehicle V at an appropriate position even if the vehicle stopper Z is not present. Further, the action plan unit 43 controls the movement of the vehicle V such that the driving force of the vehicle V or the driving torque of each wheel W becomes small before the vehicle V is stopped. Accordingly, the riding comfort of the vehicle V can be further improved as compared with a case where the action plan unit 43 does not control the movement of the vehicle V in this way.

<The Driving Force Setting Process>

Figure 6:
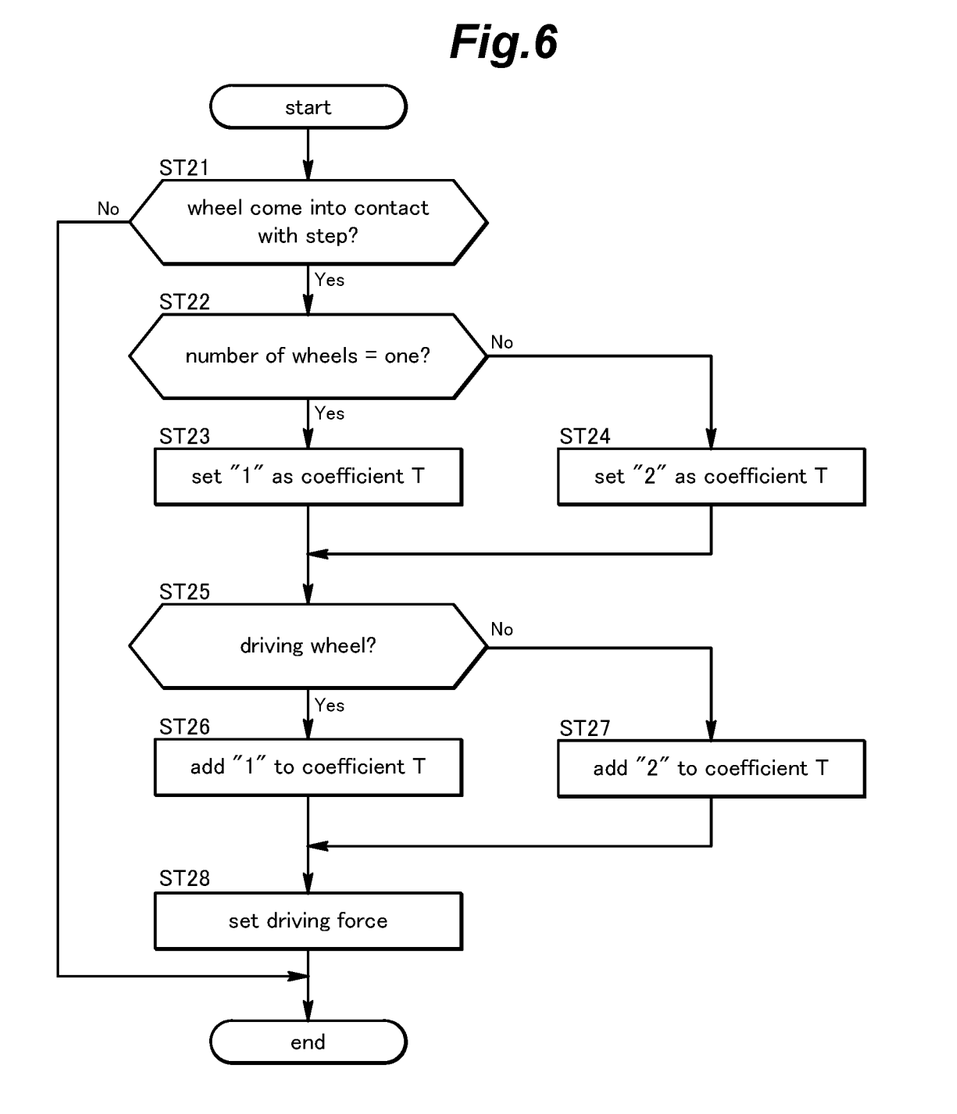
FIG. 6 is a flowchart of a driving force setting process in the parking assist system according to the embodiment.

Next, with reference to FIGS. 4 and 6, the driving force setting process (step ST18) of the above driving process will be described.

When the driving force setting process starts, the action plan unit 43 determines whether at least one wheel W has come into contact with a step S (for example, a flap in a coin-operated parking lot) located on the upstream side of the vehicle stopper Z (step ST21). For example, in a case where at least one of the wheel speed sensors that compose the vehicle speed sensor 8a detects that the wheel speed has decreased by a value equal to or more than a threshold Th, the action plan unit 43 determines that at least one wheel W has come into contact with the step S. On the other hand, in a case where none of the wheel speed sensors detect that the wheel speed has decreased by the value equal to or more than the threshold Th, the action plan unit 43 determines that none of the wheels W have come into contact with the step S. In a case where the action plan unit 43 determines that none of the wheels W have come into contact with the step S (in a case where the determination in step ST21 is No), the driving force setting process ends without changing the driving force of the vehicle V.

On the other hand, in a case where the action plan unit 43 determines that at least one wheel W has come into contact with the step S (in a case where the determination in step ST21 is Yes), the action plan unit 43 determines whether the number of wheels W that have come into contact with the step S is one (step ST22). For example, in a case where only one of the wheel speed sensors detects that the wheel speed has decreased by the value equal to or more than the threshold Th, the action plan unit 43 determines that the number of wheels W that have come into contact with the step S is one. On the other hand, in a case where plural wheel speed sensors detect that the wheel speeds have decreased by the value equal to or more than the threshold Th, the action plan unit 43 determines that the number of wheels W that have come into contact with the step S is not one (namely, the number of wheels W that have come into contact with the step S is plural).

In a case where the action plan unit 43 determines that the number of wheels W that have come into contact with the step S is one (in a case where the determination in step ST22 is Yes), the action plan unit 43 sets "1" as a coefficient T for determining the driving force of the vehicle V (step ST23).

On the other hand, in a case where the action plan unit 43 determines that the number of wheels W that have come into contact with the step S is not one (in a case where the determination in step ST22 is No), the action plan unit 43 sets "2" as the coefficient T (step ST24).

After the coefficient T is set in step ST23 or step ST24, the action plan unit 43 determines whether the wheel W that has come into contact with the step S is a driving wheel (step ST25). For example, in a case where the wheel speed sensor provided for the driving wheel detects that the wheel speed has decreased by the value equal to or more than the threshold Th, the action plan unit 43 determines that the wheel W that has come into contact with the step S is the driving wheel. On the other hand, in a case where the wheel speed sensor provided for a driven wheel detects that the wheel speed has decreased by the value equal to or more than the threshold Th, the action plan unit 43 determines that the wheel W that has come into contact with the step S is not the driving wheel (namely, the wheel W that has come into contact with the step S is the driven wheel).

In a case where the action plan unit 43 determines that the wheel W that has come into contact with the step S is the driving wheel (in a case where the determination in step ST25 is Yes), the action plan unit 43 adds "1" to the coefficient T set in step ST23 or step ST24 (step ST26). On the other hand, in a case where the action plan unit 43 determines that the wheel W that has come into contact with the step S is not the driving wheel (in a case where the determination in step ST25 is No), the action plan unit 43 adds "2" to the coefficient T set in step ST23 or step ST24 (step ST27).

Next, the action plan unit 43 sets the driving force of the vehicle V in proportion to the final value of the coefficient T (step ST28). For example, in a case where the action plan unit 43 determines that the number of wheels W that have come into contact with the step S is one (Yes in step ST22) and that the wheel W that has come into contact with the step S is the driving wheel (Yes in step ST25), the final value of the coefficient T becomes 2 (=1+1). On the other hand, in a case where the action plan unit 43 determines that the number of wheels W that have come into contact with the step S is not one (No in step ST22) and that the wheels W that have come into contact with the step S are not the driving wheels (No in step ST25), the final value of the coefficient T becomes 4 (=2+2). Accordingly, the action plan unit 43 sets the driving force of the vehicle V larger in the latter case than in the former case.

Even if the final value of the coefficient T becomes 4 (maximum value), the driving force of the vehicle V set by the action plan unit 43 in step ST28 is limited to a value less than the upper limit U (see step ST19 of the driving process). Accordingly, even if the final value of the coefficient T becomes 4 (maximum value), the driving torque of each wheel W is smaller than the climbing-over torque.

When step ST28 ends, the driving force setting process ends. When the driving force setting process ends, the action plan unit 43 controls the powertrain 4 so as to generate the driving force of the vehicle V set in the driving force setting process. In another embodiment, the action plan unit 43 may execute a brake force setting process instead of the above driving force setting process, thereby controlling the brake device 5 so as to generate the brake force set in the brake force setting process.

As described above, in a case where the action plan unit 43 determines that at least one wheel W has come into contact with the step S, the action plan unit 43 sets the driving force of the vehicle V based on a contact state of the step S and each wheel W such that the driving torque of each wheel W is smaller than the climbing-over torque. Thus, it is possible to set the driving force of the vehicle V to an appropriate value based on the contact state of the step S and each wheel W while preventing each wheel W from climbing over the vehicle stopper Z.

Further, the action plan unit 43 is configured to set the driving force of the vehicle V based on the number of wheels W that have come into contact with the step S. More specifically, the action plan unit 43 sets the driving force of the vehicle V such that the driving force of the vehicle V increases as the number of wheels W that have come into contact with the step S increases. Thus, it is possible to set the driving force of the vehicle V to an appropriate value based on the number of wheels W that have come into contact with the step S.

Further, the action plan unit 43 is configured to set the driving force of the vehicle V according to whether the wheel W that has come into contact with the step S is the driving wheel or the driven wheel. More specifically, the action plan unit 43 sets the driving force of the vehicle V larger in a case where the wheel W that has come into contact with the step S is the driven wheel, as compared with a case where the wheel W that has come into contact with the step S is the driving wheel. Thus, it is possible to set the driving force of the vehicle V to an appropriate value according to whether the wheel W that has come into contact with the step S is the driving wheel or the driven wheel.

In another embodiment, the action plan unit 43 may set the driving force of the vehicle V based on the height of the step S. More specifically, the action plan unit 43 may set the driving force of the vehicle V such that the driving force of the vehicle V increases as the height of the step S increases.

<The Correction Process of the Parking Position>

After the above automatic parking process is completed, the action plan unit 43 executes a correction process of the parking position as needed. For example, the action plan unit 43 may execute the correction process of the parking position in a case where the distance between the vehicle V parked by executing the automatic parking process and another vehicle adjacent to the vehicle V is less than a prescribed reference distance or in a case where the center of the vehicle V parked by executing the automatic parking process deviates from the center of the target parking position P3 by a width equal to or more than a prescribed reference width.

At the start of the correction process of the parking position, both the forward movement speed and the backward movement speed of the vehicle V are set to the speed equal to or less than V2. For example, the action plan unit 43 moves the vehicle V forward from the target parking position P3 at the speed equal to or less than V2. After that, the action plan unit 43 switches the moving direction of the vehicle V, and then moves the vehicle V backward at the speed equal to or less than V2, thereby returning the vehicle V to the target parking position P3. At that time, the action plan unit 43 corrects the parking position of the vehicle V by controlling the steering device 6 and changing the steering angle of each wheel W.

As described above, in a case where the action plan unit 43 corrects the parking position of the vehicle V after the vehicle V has moved to the target parking position P3, the action plan unit 43 sets a first maximum vehicle speed (V2) lower than a second maximum vehicle speed (V1). The first maximum vehicle speed (V2) is the maximum vehicle speed of the vehicle V at the correction of the parking position of the vehicle V (namely, at the correction process of the parking position). The second maximum vehicle speed (V1) is the maximum vehicle speed of the vehicle V at the movement of the vehicle V to the target parking position P3 (namely, at the automatic parking process). Thus, the occupant can easily perform a brake operation (for example, a pressing on the brake pedal 24) of the vehicle V when the vehicle V moves from the target parking position P3 for correcting the parking position of the vehicle V.

<How to Recognize the Low Object>

Next, how to recognize the above low object by the external environment recognizing unit 41 will be described.

In a case where the external environment sensor 7 detects the low object in the specific area R in the execution of perpendicular parking, the external environment recognizing unit 41 recognizes this low object as the vehicle stopper Z, and thus executes the parking control of the vehicle V targeted at the low object. On the other hand, in a case where the external environment sensor 7 detects the low object in an area other than the specific area R in the execution of the perpendicular parking, the external environment recognizing unit 41 does not recognize this low object as the vehicle stopper Z or the obstacle. For example, even if the external environment sensor 7 detects a low step S (a step S whose height is equal to or less than the reference height H) on the upstream side of the specific area R, the external environment recognizing unit 41 does not recognize this low step S as the vehicle stopper Z or the obstacle. Thus, it is possible to continue parking assistance even if the low step S is present on the upstream side of the specific area R. Accordingly, the parking assist system 1 can be more convenient.

In a case where the external environment sensor 7 detects the low object in an opposite area (an area on the opposite side of the road with respect to the vehicle V) in the execution of the perpendicular parking, the external environment recognizing unit 41 recognizes this low object as a curb. On the other hand, in a case where the external environment sensor 7 detects the low object in an area other than the opposite area, the external environment recognizing unit 41 does not recognize this low object as the curb or the obstacle. Thus, it is possible to continue the parking assistance even if the low object is present in the area other than the opposite area. Accordingly, the parking assist system 1 can be more convenient.

Concrete embodiments of the present invention have been described in the foregoing, but the present invention should not be limited by the foregoing embodiments and various modifications and alterations are possible within the scope of the present invention.

The invention claimed is:

1. A parking assist system configured to autonomously move a vehicle to a target parking position, comprising:
   a distance acquiring unit configured to acquire a distance between the vehicle and a vehicle stopper provided in the target parking position; and
   a control unit configured to control a movement of the vehicle to the target parking position based on the distance acquired by the distance acquiring unit.

2. The parking assist system according to claim 1, wherein when the vehicle moves to the target parking position, the control unit limits a vehicle speed of the vehicle and/or an N times differential value (N is an integer) of the vehicle speed within a prescribed range.

3. The parking assist system according to claim 1, wherein the vehicle includes at least one wheel, and when the vehicle moves to the target parking position, the control unit controls a driving force and/or a brake force of the vehicle such that driving torque of the wheel is smaller than climbing-over torque that enables the wheel to climb over the vehicle stopper.

4. The parking assist system according to claim 3, wherein while the vehicle is moving to the target parking position, the control unit determines whether the wheel has come into contact with a step located on an upstream side of the vehicle stopper in a moving direction of the vehicle to the target parking position, and
   in a case where the control unit determines that the wheel has come into contact with the step, the control unit sets the driving force of the vehicle based on a contact state of the step and the wheel such that the driving torque of the wheel is smaller than the climbing-over torque.

5. The parking assist system according to claim 4, wherein the at least one wheel comprises a plurality of wheels, and
   the control unit is configured to set the driving force of the vehicle based on the number of wheels that have come into contact with the step.

6. The parking assist system according to claim 4, wherein the control unit is configured to set the driving force of the vehicle according to whether the wheel that has come into contact with the step is a driving wheel or a driven wheel.

7. The parking assist system according to claim 1, wherein in a case where the control unit corrects a parking position of the vehicle after the vehicle has moved to the target parking position, the control unit sets a first maximum vehicle speed lower than a second maximum vehicle speed, the first maximum vehicle speed being a maximum vehicle speed of the vehicle at correction of the parking position of the vehicle, the second maximum vehicle speed being the maximum vehicle speed of the vehicle at the movement of the vehicle to the target parking position.

8. The parking assist system according to claim 1, wherein when the vehicle moves the distance acquired by the distance acquiring unit, the control unit stops the vehicle.

9. The parking assist system according to claim 1, wherein in a case where the vehicle stopper is not present in the target parking position, the distance acquiring unit sets a virtual vehicle stopper in the target parking position and acquires a distance between the vehicle and the virtual vehicle stopper, and
   in the case where the vehicle stopper is not present in the target parking position, the control unit controls the movement of the vehicle to the target parking position based on the distance between the vehicle and the virtual vehicle stopper.

10. The parking assist system according to claim 1, wherein in a case where an object whose height is equal to or lower than a prescribed reference height is detected in a specific area of the target parking position in execution of perpendicular parking, the distance acquiring unit recognizes the object as the vehicle stopper, and
   in a case where the object whose height is equal to or lower than the reference height is detected in an area other than the specific area in the execution of the perpendicular parking, the distance acquiring unit does not recognize the object as the vehicle stopper or an obstacle.

* * * * *